(12) United States Patent
Peck et al.

(10) Patent No.: US 11,969,715 B2
(45) Date of Patent: Apr. 30, 2024

(54) DUAL DISPERSED MOX-CUOX/CO$_3$O$_4$ SUPPORTED METAL OXIDE CATALYSTS FOR DIRECT NOX DECOMPOSITION

(71) Applicant: Toyota Motor Engineering & Manufacturing North America, Inc., Plano, TX (US)

(72) Inventors: Torin C. Peck, Ann Arbor, MI (US); Benjamin A. Grayson, Ann Arbor, MI (US); Charles A. Roberts, Farmington Hills, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 17/581,645

(22) Filed: Jan. 21, 2022

(65) Prior Publication Data
US 2023/0271168 A1    Aug. 31, 2023

(51) Int. Cl.
| | | |
|---|---|---|
| *B01J 23/00* | (2006.01) |
| *B01J 23/06* | (2006.01) |
| *B01J 23/10* | (2006.01) |
| *B01J 23/12* | (2006.01) |
| *B01J 23/72* | (2006.01) |
| *B01J 23/80* | (2006.01) |
| *B01J 23/83* | (2006.01) |
| *F01N 3/08* | (2006.01) |
| *F01N 3/10* | (2006.01) |

(52) U.S. Cl.
CPC ............. *B01J 23/80* (2013.01); *B01J 23/005* (2013.01); *B01J 23/72* (2013.01); *F01N 3/0842* (2013.01); *F01N 3/101* (2013.01); *F01N 2570/14* (2013.01)

(58) Field of Classification Search
CPC . B01J 23/005; B01J 23/06; B01J 23/10; B01J 23/12; B01J 23/72; B01J 23/80; F01N 3/0842; F01N 3/101
See application file for complete search history.

(56) References Cited

U.S. PATENT DOCUMENTS

| | | | | |
|---|---|---|---|---|
| 3,888,792 A * | 6/1975 | Hughes | ..................... | B01J 23/83 423/404 |
| 3,931,390 A * | 1/1976 | Palilla | ................ | B01D 53/8609 502/328 |
| 3,985,681 A * | 10/1976 | Senes | ..................... | C01B 21/265 502/328 |
| 4,199,479 A * | 4/1980 | Wilkes | ...................... | B01J 23/80 568/864 |
| 4,430,315 A * | 2/1984 | Caldwell | ................... | B01J 23/76 423/491 |
| 4,442,227 A * | 4/1984 | Caldwell | ................... | B01J 23/76 502/328 |

(Continued)

*Primary Examiner* — Cam N. Nguyen
(74) *Attorney, Agent, or Firm* — Jordan IP Law, LLC

(57) ABSTRACT

A catalyst for direct decomposition removal of NOx from an exhaust gas stream to N$_2$ and O$_2$, the catalyst comprising a dual dispersed supported metal oxide material, which comprises MOx-CuOx dispersed on a CO$_3$O$_4$ spinel oxide support, wherein M is selected from the group consisting of Zn, Ce, Mg, Tb, and Gd. The dual dispersed supported metal oxide catalysts have good activity and selectivity for N$_2$.

20 Claims, 1 Drawing Sheet

(56) References Cited

U.S. PATENT DOCUMENTS 5,258,340 A * 11/1993 Augustine ............ B01D 53/864
502/313
5,320,998 A *  6/1994 Horiuchi ................. B01J 23/72
502/259

* cited by examiner

DUAL DISPERSED MOX-CUOX/CO₃O₄ SUPPORTED METAL OXIDE CATALYSTS FOR DIRECT NOX DECOMPOSITION

TECHNICAL FIELD

The present disclosure generally relates to dual dispersed MOx-CuOx/Co$_3$O$_4$ supported metal oxide catalysts for direct decomposition removal of NOx from an exhaust gas stream, methods of making the catalysts, and methods of using the catalyst.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

NOx (N$_2$O, NO, NO$_2$) emissions are contributors to global warming, ozone depletion, acid rain, human health issues, etc. Direct NOx decomposition allows for complete combustion of fuel which would decrease toxic emissions such as CO and other carcinogenic compounds, such as short chain aromatic hydrocarbons, as well as removing harmful NOx emissions, thus improving human health. Fuel economy would be significantly improved, naturally followed by a decreased demand in oil/fossil fuels; in both cases risk to the environment is reduced.

Catalysts effective at removing NOx from exhaust emissions are desirable to protect the environment and to comply with regulations for that purpose. It is desirable that such catalysts convert NOx to inert nitrogen gas, instead of converting NOx to other nitrogen-containing compounds. The oxidation of NO to NO$_2$ is a thermodynamically favorable reaction at lower reaction temperatures (i.e., from about 400° C. to about 650° C.) and inhibits formation of N$_2$ during decomposition. Therefore, catalysts that are effective at low temperature may have additional utility for vehicles. Currently, a three-way catalyst (TWC) is utilized to purify automotive NOx emissions to benign N$_2$ and O$_2$, however the use of a reductant molecule (CO, hydrocarbon, etc.) is necessary in this reaction process, which is sourced via incomplete fuel combustion. Accordingly, it would be desirable to provide a catalyst for direct NOx decomposition that would eliminate the use of reducing agents and that is effective at low temperatures and has high selectivity to N$_2$ formation while maintaining high overall activity for automotive emission reactions.

SUMMARY

This section provides a general summary of the disclosure and is not a comprehensive disclosure of its full scope or all of its features.

The present disclosure relates to catalysts for direct decomposition removal of NOx from an exhaust gas stream to N$_2$ and O$_2$.

In one aspect the catalyst comprising a dual dispersed supported metal oxide material, which comprises MOx-CuOx dispersed on a Co$_3$O$_4$ spinel oxide support. The metal, M, is selected from the group consisting of Zn, Ce, Mg, Tb, and Gd, and may be present in amount from about 0.1 wt % to about 5.0 wt %. Cu is present in an amount from about 1.0 wt % to about 5.0 wt %. The amount of M and/or Cu may not exceed 7 wt %. In some examples, the amount of M and/or Cu may not exceed 6 wt %. In some examples M may be present in an amount of from about 0.5 wt % to about 3.0 wt %, or from about 0.5 wt % to about 1.5 wt %. In some examples Cu may be present in an amount from about 2.0 wt % to about 5.0 wt % or in an amount from about 2.5 wt % to about 3.5 wt %. The dual dispersed supported metal oxide catalyst of the present disclosure may be synthesized by incipient wetness impregnation techniques or precipitation deposition techniques.

In another aspect, the present disclosure provides a catalytic converter, comprising: a body defining a chamber, the body having an inlet to receive an exhaust gas stream into the chamber, and an outlet to allow the exhaust gas stream to exit the body; and a catalyst arranged in the chamber for direct decomposition removal of NOx from exhaust gas stream, the catalyst comprising a dual dispersed supported metal oxide material of the present disclosure, which comprises MOx-CuOx on a Co$_3$O$_4$ spinel oxide support. The catalytic converter may be configured to flow the exhaust gas stream therethrough at a temperature of from about 300° C. to about 650° C.

In another aspect, the present disclosure provides A method for direct decomposition removal of NOx from an exhaust gas stream, the method comprising: exposing an exhaust gas having NOx to a catalyst which comprises a catalyst comprising a dual dispersed supported metal oxide of the present disclosure, which comprises MOx-CuOx on a Co$_3$O$_4$ spinel oxide support. The method is operable at exhaust gas stream at a temperature of from about 300° C. to about 650° C.

DRAWINGS

The present disclosure will become more fully understood from the detailed description and the accompanying drawings wherein.

Figure 1:
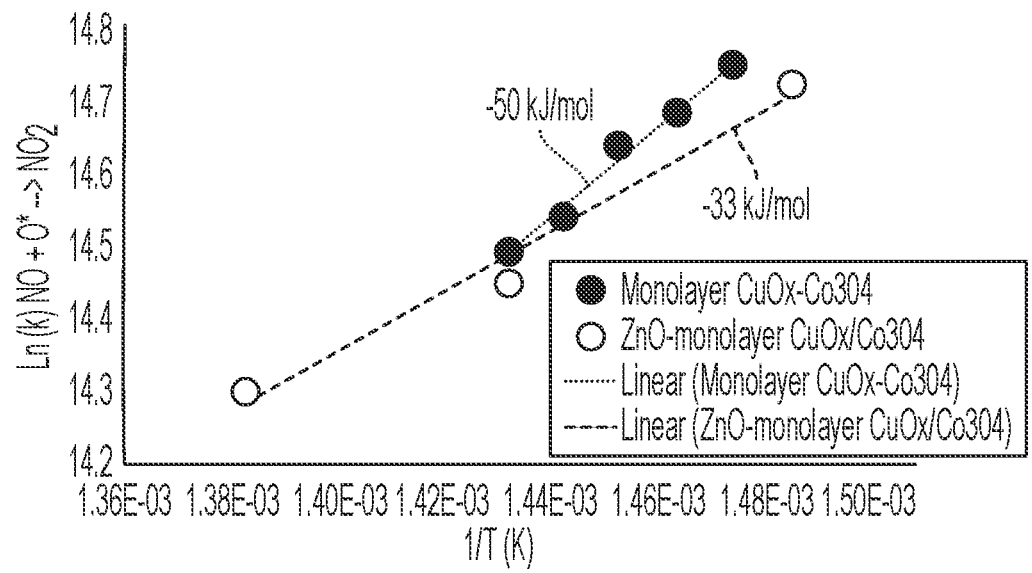
FIG. 1 illustrates undesired NO$_2$ formation plotted as a function of 1/T (K) with the calculated activation energies.

It should be noted that the figures set forth herein are intended to exemplify the general characteristics of the methods, algorithms, and devices among those of the present technology, for the purpose of the description of certain aspects. These figures may not precisely reflect the characteristics of any given aspect and are not necessarily intended to define or limit specific embodiments within the scope of this technology. Further, certain aspects may incorporate features from a combination of figures.

DESCRIPTION

The present disclosure provides dual dispersed supported metal oxide materials for direct NOx decomposition applications to remove NOx from exhaust gas systems. Dual dispersed supported metal oxides as discussed herein refers to two metal oxides which are homogeneously dispersed on a support, but not necessarily in a single layer. Direct decomposition, as discussed herein, refers to catalytic transformation of nitrogen oxides to elemental nitrogen and oxygen. his differs, for example, from catalytic reduction of nitrogen oxides to ammonia and water. Low temperature (i.e., from about 300° C. to about 650° C.), direct decomposition is accomplished without the need of a reductant or secondary reducing agents (i.e., $H_2$, CO, $C_3H_6$ or other hydrocarbons and/or soot), thereby improving fuel efficiency. This is greatly beneficial to improve energy utilization of a vehicle engine because the reducing agents of carbon monoxide and unburnt hydrocarbons are not produced because of efficient combustion.

Direct NOx decomposition allows for complete combustion of fuel which would decrease toxic emissions such as CO and other carcinogenic compounds, such as short chain aromatic hydrocarbons, as well as removing harmful NOx emissions, thus improving human health. Fuel economy would be significantly improved, naturally followed by a decreased demand in oil/fossil fuels; in both cases risk to the environment is reduced.

Previously reported catalysts for NOx decomposition in this temperature region have lower reaction rates and poor selectivity to $N_2$. The dual dispersed supported metal oxides of the present disclosure, such as MOx-CuOx/$Co_3O_4$, provide for improved total yield of product $N_2$ and product selectivity for to $N_2$ (versus undesired $N_2O$ and/or $NO_2$ products) during low temperature direct decomposition as compared to catalysts previously reported in the literature and the previously disclosed NOx decomposition catalyst: CuOx/$Co_3O_4$ obtained by incipient wetness impregnation, which may be considered by some as being the closest related technology. Because of the high selectivity to $N_2$ for the dual dispersed supported metal oxide catalyst of the present disclosure, the undesirable $N_2O$ product is not produced in a significant quantity during the direct NOx decomposition over $Co_3O_4$ spinel-supported dual dispersed supported metal oxide. Generally, yield of $N_2O$ is 0%, or less than 2% $N_2O$ selectivity after 3 hrs in stream at 400° C. during NO decomposition catalysis as described herein for the dual dispersed supported metal oxide catalysts of the present disclosure. It has been reported that the Cu—O—Co interfacial bonds play an important role in the NO decomposition mechanism. Peck, et al., "Monolayer supported CuOx/$Co_3O_4$ as an active and selective low temperature NOx decomposition catalyst," Catal. Sci. Technol., 2019, 9, 1132-1140. The addition of the MOx component decreases the activation energy for the reaction, by creating a more labile surface oxygen species. An added benefit is that the dual dispersed supported metal oxide catalysts of the present disclosure are comprised of metal oxides which are cheaper than PGMs typically used in TWC.

In one aspect, the dual dispersed supported metal oxide material comprises MOx-CuOx on a $Co_3O_4$ spinel oxide support, wherein M represents a metal selected from Zn, Ce, Mg, Tb, and Gd. In some examples, M may be Zn, Mg, or Tb. The metal M may be present in amount from about 0.1 wt % to about 5 wt %, from about 0.5 wt % to about 3.0 wt %, or from about 0.5 wt % to about 1.5 wt %. Cu may be present in an amount from about 1.0 wt % to about 5.0 wt %, 2.0 wt % to about 5.0 wt %, or from about 2.5 wt % to about 3.5 wt %. It is desirable that the amount of Cu and/or M in the dual dispersed supported metal oxide catalyst of the present disclosure should not exceed 7 wt %, or in some examples, should not exceed 6 wt % to achieve the desired results of activity and $N_2$ selectivity. That is, the amount of Cu alone, the amount of M alone, or the amount of Cu and M combined should not exceed 7 wt % or in some examples, should not exceed 6 wt %.

The dual dispersed supported metal oxide catalyst materials of the disclosure are active at exhaust temperatures of emission gas from gasoline or diesel engines, and particularly, exhaust gas/stream low temperature regions from about 300° C. to about 650° C., or from about 325° C. to about 500° C., or from about 350° C. to about 450° C. In some examples, the catalysts are active at a temperature of lower than about 500° C., lower than about 450° C., lower than about 400° C., lower than about 350° C., lower than about 325° C., and even lower than or at about 300° C.

The present disclosure includes methods for synthesizing the dual dispersed supported metal oxide catalysts. In some examples MOx-CuOx is dispersed on a metal oxide support, specifically, a spinel oxide with known $N_2O$ decomposition activity, such as $Co_3O_4$, via incipient wetness impregnation or precipitation deposition.

Using incipient wetness impregnation techniques for example, required amounts of the metal precursors such as nitrates, chlorides, sulfates, acetates, etc., may be dissolved separately in water and the resulting solution of the copper precursor is mixed with one of the other metal precursor solutions and then the mixed metal precursor solution is added dropwise onto the support material. For example, copper nitrate ($Cu(NO_3)_2$) is mixed with one of the other metal nitrate solutions, e.g., zinc nitrate ($Zn(NO_3)_2$), magnesium nitrate ($Mg(NO_3)_2$), cerium nitrate ($Ce(NO_3)_3$), terbium nitrate ($Tb(NO_3)$) or gadolinium nitrate ($Gd(NO_3)_3$). The mixed metal nitrate solution may then be deposited dropwise onto the $Co_3O_4$ support material. The obtained material may then be dried, calcined at a predetermined temperature, predetermined time, and predetermined ramp rate to obtain a catalyst having the desired properties. For example, calcining may be at a temperature of from about 350° C. to about 800° C. for about 1-2 hrs. at a ramp rate from ambient temperature to about 2° C./min. In some examples calcining may be at a temperature of about 450° C. for about 2 hrs. at a ramp rate of about 2° C./min.

A simple and scalable precipitation deposition technique may also be used to synthesize the dual dispersed supported metal oxide catalysts of the present disclosure, wherein an aqueous suspension of $Co_3O_4$ is prepared including a precipitating agent, such as $Na_2CO_3$, $NH_4OH$, NaOH, $(NH_4)_2CO_3$. In some examples, $Na_2CO_3$ is preferred. The required amounts of the metal precursors such as nitrates, chlorides, sulfates, acetates, etc., may be dissolved separately in water and the resulting solution of the copper precursor is mixed with one of the other metal precursor solutions and then the mixed metal precursor solution is added to the support. For example, copper nitrate ($Cu(NO_3)_2$) is mixed with one of the other metal nitrate solutions, e.g., zinc nitrate ($Zn(NO_3)_2$), magnesium nitrate ($Mg(NO_3)_2$), cerium nitrate ($Ce(NO_3)_3$), terbium nitrate ($Tb(NO_3)_3$) or gadolinium nitrate (Gd$(NO_3)_3$). The mixed metal nitrate solution is then added to the $Co_3O_4$ suspension. The supernatant liquid may be decanted and filtered to obtain a precipitate. The obtained precipitate may then be dried, calcined at a predetermined temperature, predetermined time, and predetermined ramp rate to obtain a catalyst having the desired properties. Calcining may be at a temperature from about 350° C. to about 800° C. for about 1-2 hrs. at a ramp rate from ambient temperature to about 2° C./min. In some examples calcining may be at a temperature of about 450° C. for about 1 hour.

The dual dispersed supported metal oxide catalyst materials of the present disclosure can be used with exhaust gas streams, particularly with catalytic converters for vehicles, automobiles, and the like. For example, the dual dispersed supported metal oxide catalyst materials can be used in a chamber or enclosure, such as a catalytic converter having an inlet and an outlet. As is commonly known to those of ordinary skill in the art, such a chamber or enclosure can be configured to receive an exhaust gas stream through the inlet and to the exit the exhaust gas stream through the outlet such that the exhaust gas stream has a particular defined flow chamber direction. In an example, the catalytic converter comprises a body defining a chamber, the body having an inlet to receive an exhaust gas stream into the chamber, and an outlet to allow the exhaust gas stream to exit the body; and a catalyst arranged in the chamber for direct decomposition removal of NOx from exhaust gas stream, the catalyst comprising a dual dispersed supported metal oxide material, which comprises MOx-CuOx on a $Co_3O_4$ spinel oxide support, wherein M represents a metal selected from the group consisting of Zn, Ce, Mg, Tb and Gd. In some examples, M may be Zn, Mg, or Tb. The metal M may be present in amount from about 0.1 wt % to about 5.0 wt %, from about 0.5 wt % to about 3.0 wt %, or from about 0.5 wt % to about 1.5 wt %. Cu may be present in an amount from about 1.0 wt % to about 5.0 wt %, from about 2.0 wt % to about 5.0 wt %, or from about 2.5 wt % to about 3.5 wt %. The catalytic converter may be configured to flow the exhaust gas stream through the catalytic converter at a temperature of from about 300° C. to about 650° C., or from about 325° C. to about 500° C., or from about 350° C. to about 450° C. In some examples, catalytic converter may be configured to flow the exhaust gas stream through the catalytic converter at a temperature of lower than about 500° C., lower than about 450° C., lower than about 400° C., lower than about 350° C., lower than about 325° C., and even lower than or at about 300° C.

The present disclosure also relates to a method for direct decomposition removal of NOx from an exhaust gas stream, the method comprising exposing an exhaust gas having NOx to a catalyst which comprises a catalyst comprising a dual dispersed supported metal oxide, which comprises MOx-CuOx on a $Co_3O_4$ spinel oxide support, wherein M represents a metal selected from the group consisting of Zn, Ce, Mg, Th and Gd. In some examples, M may be Zn, Mg, or Th. The metal M is present in amount from about 0.1 wt % to about 5.0 wt %, from about 0.5 wt % to about 3.0 wt %, or from about 0.5 wt % to about 1.5 wt % Cu is present in an amount from about 1.0 wt % to about 5.0 wt %, from about 2.0 wt % to about 5.0 wt %, or from about 2.5 wt % to about 3.5 wt %. The dual dispersed supported metal oxide catalyst materials of the disclosure are active at exhaust temperatures of emission gas from gasoline or diesel engines, and particularly, exhaust gas/stream low temperature regions from about 300° C. to about 650° C., or from about 325° C. to about 500° C., or from about 350° C. to about 450° C. In some examples, the catalysts are active at a temperature of lower than about 500° C., lower than about 450° C., lower than about 400° C., lower than about 350° C., lower than about 325° C., and even lower than or at about 300° C.

EXAMPLES

Various aspects of the present disclosure are further illustrated with respect to the following examples. It is to be understood that these examples are provided to illustrate specific embodiments of the present disclosure and should not be construed as limiting the scope of the present disclosure in or to any particular aspect.

Synthesis and Material Characterization

MOx-CuOx/$Co_3O_4$ samples with improved performance over CuOx/$Co_3O_4$ are synthesized via two methods. One method is an incipient wetness impregnation technique. The second method is precipitation deposition. In both cases, the support material ($Co_3O_4$) utilized was obtained from Sigma Aldrich Corporation.

For incipient wetness impregnation, 3 grams of $Co_3O_4$ (Sigma Aldrich) was placed in a 100 mL alumina crucible. Next, $Cu(NO_3)_2*2.5H_2O$ and metal nitrates of Zn, Mg, Ce, Tb, or Gd were measured and added to a 3 mL microcentrifuge tube to target 0.5-10 wt. % Cu, and 0.5-10 wt. % M. Via micropipette, 1 mL of deionized $H_2O$ was added, followed by 1 min of vortex mixing at ~3,000 rpm to ensure complete dissolution of the metal nitrate salts. The resulting solution was deposited dropwise onto the $Co_3O_4$, with stirring and breaking up of chunks. Afterwards, the material is placed in a furnace and dried at 120 Celsius for 12 hours, followed by a 2° C./min ramp to 450 Celsius for 2 hours, before being returned to ambient conditions without temperature control.

For precipitation deposition, 3 grams of $Co_3O_4$ (Sigma Aldrich), were placed in a 1,000 mL beaker. Next 400 mL of deionized water was added, followed by 5 g of $Na_2CO_3*H_2O$. While stirring, a 100 mL solution of mixed metal nitrates composed of $Cu(NO_3)_2*2.5H_2O$ and one of another Metal Nitrate, such as $Zn(NO_3)_2*6H_2O$, $Mg(NO_3)_2*6H_2O$, etc., was added to the $Co_3O_4$ aqueous suspension slowly, under magnetic stirring. The stirring was stopped after one hour, and allowed to sit overnight, prior to filtration and washing with 1,000 mL deionized water. The material was placed into a crucible, then dried at 120 Celsius for 12 hours, followed by calcination at 450 Celsius for 1 hour.

Performance Evaluation

The catalytic activity of the materials for NO decomposition were evaluated using a microreactor system (Micromeritics Particulate Systems PID Microactivity Reactor) equipped with a quartz plug flow reactor and coupled with an FTIR Detector (CAI Analytics). Approximately 500 mg of catalyst, was placed between a bed of quartz wool to maintain a 1 cm bed length of catalyst for total gas hourly space velocity (GHSV of ~2,100 $h^{-1}$). The samples were pretreated to 450° C. at a ramp rate of 10° C./min in 27.8 sccm of 10% $O_2$/He, held for a total of 60 minutes, followed by a 15-minute purge in He while cooling to a temperature of 400° C. To determine the FTIR signal corresponding to 100% conversion of NO, 27.8 sccm of UHP He was flowed over the bypass. Then, a reaction mixture containing approximately 1% NOx/1% Ar/He, balance He, was flowed at 27.8 sccm for 30 minutes to determine the FTIR signal corresponding to 0% conversion of NO. Next, the flow was stabilized over the catalyst, and the reaction was conducted for three hours. NO Conversion was held to less than 25% to ensure differential kinetics. $N_2$ production is inferred based on a nitrogen mass-balance calculation and reported as activity in units of μmol NO to $N_2$/g catalyst/second. To determine the activation energy for the undesired $NO_2$ product formation over ZnOx-CuOx/$Co_3O_4$ catalyst in comparison to CuOx/$Co_3O_4$ catalyst, additional temperatures from 400-450 Celsius were evaluated in accordance with the above protocol. FIG. 1 shows the formation of undesired $NO_2$ product plotted as a function of 1/T (K) with the calculated activation energies included. A number closer to 0 (−33 vs. −50 kJ/mol) indicates the reaction is less downhill, caused by the addition of ZnOx to the CuOx/$Co_3O_4$ catalyst.

Figure 2:
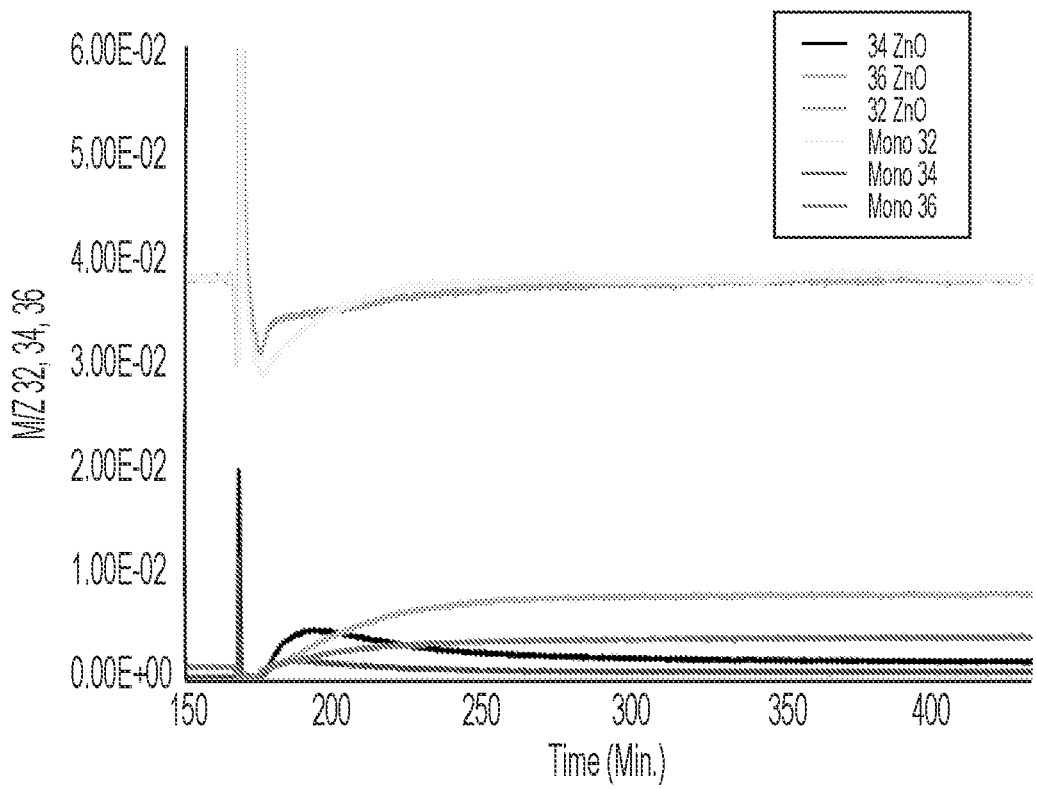
FIG. 2 illustrates O$_2$ product speciation over ZnOx-CuOx/Co$_3$O$_4$ (ZNO) and monolayer CuOx/Co$_3$O$_4$ (Mono) as a function of time on stream in 0.3% $^{15}$N$^{18}$O.

Furthermore, to investigate the effect of Zn on oxygen product speciation/origination, evaluation in a stream of ~0.3% $^{15}N^{18}O$/He was conducted, in the same protocol, except for the use of a Mass Spectrometer Detector (Cirrus2 MKS). Isotopically labeled gas was used to determine the origin (NO gas, pretreatment gas, or catalyst bulk) of oxygen in the $O_2$ product. When utilizing $^{15}N^{18}O$, $O_2$ with three different molecular weights can form, depending on origin of oxygen atom, such as m/z 32 (both oxygen atoms from catalyst), m/z 34 (one oxygen atom from catalyst, one oxygen from reaction gas), or m/z 36 (both oxygen atoms from reaction gas). As shown in FIG. 2, there is significantly more $^{16}O^{18}O$ (m/z 44) in the ZnOx-CuOx/Co$_3$O$_4$ sample early in time on stream in comparison to the catalyst without ZnOx. This means that one of the oxygen atoms in the reaction is from the catalyst, and one is from the reactant gas. This indicates the oxygen on the catalyst surface is more labile with the Zn addition.

Table 1 contains the catalytic activity for NO Decomposition at 400 Celsius over MOx-CuOx/Co$_3$O$_4$ catalysts, with various Cu and M content (expressed as wt. %), with various synthesis methods (Incipient Wetness Impregnation, IWI) and Precipitation Deposition (Prec. Dep.). For reference, a monolayer CuOx/Co$_3$O$_4$ catalyst obtained by incipient wetness impregnation as described in U.S. Pat. No. 10,434,471 is employed as the Comparative Example. Significant performance improvement was observed utilizing Zn, Mg, Tb, or Ce as promoters for the reaction, with samples from both precipitation deposition and incipient wetness impregnation exceeding the value of the monolayer CuOx/Co$_3$O$_4$ catalyst.

TABLE 1

NO Decomposition Activity of MOx—CuOx/Co$_3$O$_4$ Catalysts

| Examples | Cu (wt. %) | M | M (wt. %) | Synthesis Method | Activity @ 400 Celsius (μmol NO to $N_2$/g/s) |
|---|---|---|---|---|---|
| Comparative Example (monolayer CuOx/Co$_3$O$_4$) | ~3 | N/A | 0 | IWI | 0.0391 |
| 1 | 3.5 | Zn | 1.5 | Prec. Dep. | 0.0393 |
| 2 | 3 | Zn | 0.5 | Prec. Dep. | 0.0579 |
| 3 | 4 | Zn | 0.5 | Prec. Dep. | 0.0472 |
| 4 | 3 | Zn | 1.5 | Prec. Dep. | 0.061 |
| 5 | 2.5 | Zn | 2.5 | Prec. Dep. | 0.045 |
| 6 | 3.5 | Zn | 1 | Prec. Dep. | 0.0525 |
| 7 | 3 | Zn | 2 | Prec. Dep. | 0.0514 |
| 8 | 3.5 | Ce | 2.5 | Prec. Dep. | 0.0523 |
| 9 | 2 | Mg | 0.5 | Prec. Dep. | 0.0415 |
| 10 | 2.5 | Zn | 1 | Prec. Dep. | 0.0438 |
| 11 | 4 | Zn | 1.5 | Prec. Dep. | 0.0592 |
| 12 | 2.5 | Zn | 2 | Prec. Dep. | 0.061 |
| 13 | 4 | Zn | 2 | Prec. Dep. | 0.0604 |
| 14 | 3 | Zn | 1 | IWI | 0.041 |
| 15 | 3 | Zn | 1 | Prec. Dep. | 0.057 |
| 16 | 3 | Mg | 1 | Prec. Dep. | 0.045 |
| 17 | 5 | Tb | 0.5 | IWI | 0.051 |

The wt. % component of Cu and the third metal oxide phase play an important role in direct NOx decomposition activity as demonstrated in Table 2. In general, the samples having about 2.5 wt. % to 3.5 wt. % with respect to Cu, combined with a third metal oxide phase (Mg, Zn, Th) of about 0.5-1.5 wt. % showed the most significant reduction in the activation energy of the reaction. It can also be seen from Table 2 that Ce promotes the reaction at even higher loadings such as 4 wt. %, but only when Cu is a minor component such as 1 wt. %. However, if the Cu and/or third metal oxide component combined exceeds approximately 6-7 wt. %, the activity returns to a level similar to, if not less than, the monolayer CuOx/Co$_3$O$_4$ comparative example. While not intending to be bound by any particular theory, it is considered that the active site of the material is the Cu—O—Co bond, and this Cu—O—Co bond is further modified by the addition of M-O—Cu—O—Co. Once a certain threshold of Cu and/or the MOx component is exceeded, bulk crystals form which block the interface with the Co$_3$O$_4$ support.

TABLE 2

Various MOx-CuOx/Co$_3$O$_4$ Samples to Demonstrate Criticality of Composition

| Examples | Cu (wt. %) | Mg (wt. %) | Zn (wt. %) | Tb (wt. %) | Ce (wt. %) | Specific NO Decomp. Activity @400° C. |
|---|---|---|---|---|---|---|
| 18 | 0.5 | 0.5 | | | | 0.00641 |
| 19 | 0.5 | | 1.0 | | | 0.0101 |
| 20 | 1.0 | 0.5 | | | | 0.0137 |
| 21 | 1.0 | | | | 3.0 | 0.0192 |
| 22 | 1.5 | 0.5 | | | | 0.0253 |
| 23 | 1.5 | | | | 4.0 | 0.0473 |
| 9 | 2.0 | 0.5 | | | | 0.0415 |
| 24 | 2.0 | | 1.5 | | | 0.0328 |
| 5 | 2.5 | | 2.5 | | | 0.045 |
| 25 | 2.5 | 0.5 | | | | 0.0367 |
| 10 | 2.5 | | 1.0 | | | 0.0438 |
| 12 | 2.5 | | 2.0 | | | 0.061 |
| Comparative Example | 3.0 | | | | | 0.318 |
| 2 | 3.0 | | 0.5 | | | 0.0579 |
| 4 | 3.0 | | 1.5 | | | 0.061 |
| 7 | 3.0 | | 2.0 | | | 0.0514 |
| 26 | 3.5 | | | 0.5 | | 0.039 |
| 6 | 3.5 | | 1.0 | | | 0.0525 |
| 8 | 3.5 | | | | 2.5 | 0.0523 |
| 27 | 3.5 | | | | 2.0 | 0.0344 |
| 28 | 4.0 | 0.5 | | | | 0.0472 |
| 11 | 4.0 | | 1.5 | | | 0.0592 |
| 13 | 4.0 | | 2.0 | | | 0.0604 |
| 29 | 5.0 | | 2.5 | | | 0.045 |
| 30 | 6.0 | | | 1.5 | | 0.026 |
| 31 | 6.5 | | 1.5 | | | 0.0349 |
| 32 | 7.0 | | | | 2.0 | 0.023 |
| 33 | 10 | | 3.0 | | | 0.0317 |

Further, the disclosure comprises additional notes and examples as detailed below.

Clause 1. A catalyst for direct decomposition removal of NOx from an exhaust gas stream to $N_2$ and $O_2$, the catalyst comprising a dual dispersed supported metal oxide material, which comprises MOx-CuOx dispersed on a Co$_3$O$_4$ spinel oxide support, wherein
  M is selected from the group consisting of Zn, Ce, Mg, Tb, and Gd, and is present in amount from about 0.1 wt % to about 3.0 wt %, and
  Cu is present in an amount from about 2.0 wt % to about 5.0 wt %.

Clause 2. The catalyst according to clause 1, wherein Cu is present in an amount from about 2.5 wt % to about 3.5 wt %.

Clause 3. The catalyst according to clause 1 or 2, wherein M is selected from the group consisting of Zn, Mg, Ce, and Th.

Clause 4. The catalyst according to any one of clauses 1-3, wherein M is in an amount of from about 0.5 wt % to about 2.5 wt %.

Clause 5. The catalyst according to any one of clauses 1-4, wherein M is in an amount of from about 0.5 wt % to about 1.5 wt %.

Clause 6. The catalyst according to any one of clauses 1-5, which is obtained by incipient wetness impregnation or precipitation deposition.

Clause 7. A catalytic converter, comprising:
  a body defining a chamber, the body having an inlet to receive an exhaust gas stream into the chamber, and an outlet to allow the exhaust gas stream to exit the body; and
  a catalyst arranged in the chamber for direct decomposition removal of NOx from exhaust gas stream, the catalyst comprising a dual dispersed supported metal oxide material, which comprises MOx-CuOx on a $Co_3O_4$ spinel oxide support, wherein
  M is selected from the group consisting of Zn, Ce, Mg, Tb, and Gd and is present in amount from about 0.1 wt % to about 3.0 wt %, and
  Cu is present in an amount from about 2.0 wt % to about 5.0 wt %.

Clause 8. The catalytic converter according to clause 7, wherein Cu is present in an amount from about 2.5 wt % to about 3.5 wt %.

Clause 9. The catalytic converter according to clause 7 or 8, wherein M is selected from the group consisting of Zn, Mg, Ce, and Th.

Clause 10. The catalytic converter according to any one of clauses 7-9, wherein M is in an amount of from about 0.5 wt % to about 2.5 wt %.

Clause 11. The catalytic converter according to any one of clauses 7-10, wherein M is in an amount of from about 0.5 wt % to about 1.5 wt %.

Clause 12. The catalytic converter according to any one of clauses 7-11, wherein the catalyst is obtained by incipient wetness impregnation or precipitation deposition.

Clause 13. The catalytic converter according to any one of clauses 7-12, configured to flow the exhaust gas stream through the catalytic converter at a temperature of from about 300° C. to about 650° C.

Clause 14. A method for direct decomposition removal of NOx from an exhaust gas stream, the method comprising:
  exposing an exhaust gas having NOx to a catalyst which comprises a catalyst comprising a dual dispersed supported metal oxide, which comprises MOx-CuOx on a $Co_3O_4$ spinel oxide support, wherein
  M is selected from the group consisting of Zn, Mg, Ce, Tb, and Gd, and is present in amount from about 0.1 wt % to about 3.0 wt %, and
  Cu is present in an amount from about 2.0 wt % to about 5.0 wt %.

Clause 15. The method according to clause 14, wherein Cu is present in an amount from about 2.5 wt % to about 3.5 wt %.

Clause 16. The method according to clause 14 or 15, wherein M is selected from the group consisting of Zn, Mg, Ce, and Tb.

Clause 17. The method according to any one of clauses 14-16, wherein M is in an amount of from about 0.5 wt % to about 2.5 wt %.

Clause 18. The method according to any one of clauses 14-17, wherein M is in an amount of from about 0.5 wt % to about 1.5 wt %.

Clause 19. The method according to any one of clauses 14-18, wherein the exhaust gas stream is at a temperature of from about 300° C. to about 650° C.

Clause 20. The method according to any one of clauses 14-19, wherein the catalyst is obtained by incipient wetness impregnation or precipitation deposition.

Clause 21. A catalyst for direct decomposition removal of NOx from an exhaust gas stream to $N_2$ and Oz, the catalyst comprising a dual dispersed supported metal oxide material, which comprises MOx-CuOx dispersed on a $Co_3O_4$ spinel oxide support, wherein
  M is selected from the group consisting of Zn, Ce, Mg, Tb, and Gd and is present in amount from about 0.1 wt % to about 5.0 wt %,
  Cu is present in an amount from about 1.0 wt % to about 5.0 wt %, and
  wherein the amount of M and/or Cu does not exceed 7 wt %.

Clause 22. The catalyst according to clause 21, wherein Cu is present in an amount from about 2.0 wt % to about 5.0 wt %.

Clause 23. The catalyst according to clause 21 or 22, wherein Cu is present in amount from about 2.5 wt % to about 3.5 wt %.

Clause 24. The catalyst according to any one of clauses 21-23, wherein M is selected from the group consisting of Zn, Mg, Ce, and Th.

Clause 25. The catalyst according to any one of clauses 21-24, wherein M is in an amount of from about 0.5 wt % to about 3.0 wt %.

Clause 26. The catalyst according to any one of clauses 21-25, wherein M is in an amount of from about 0.5 wt % to about 1.5 wt %.

Clause 27. The catalyst according to any one of clauses 21-26, wherein M is selected from the group consisting of Zn, Mg and Th.

Clause 28. The catalyst according to clause 21, wherein M is Ce and is present in an amount of about 4 wt % and Cu is present in an amount of about 1.0 wt %-1.5 wt %.

Clause 29. The catalyst according to any one of clauses 21-28, which is obtained by incipient wetness impregnation or precipitation deposition.

Clause 30. A catalytic converter, comprising:
  a body defining a chamber, the body having an inlet to receive an exhaust gas stream into the chamber, and an outlet to allow the exhaust gas stream to exit the body; and
  a catalyst arranged in the chamber for direct decomposition removal of NOx from exhaust gas stream,
  wherein the catalyst is a catalyst according to any one of clauses 21-29.

Clause 31. A method for direct decomposition removal of NOx from an exhaust gas stream, the method comprising exposing an exhaust gas having NOx to a catalyst, wherein the catalyst is a catalyst according to any one of clauses 21-29.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A catalyst for direct decomposition removal of NOx from an exhaust gas stream to $N_2$ and $O_2$, the catalyst comprising a dual dispersed supported metal oxide material, which comprises MOx-CuOx dispersed on a $Co_3O_4$ spinel oxide support, wherein
   M is selected from the group consisting of Zn, Ce, Mg, Tb, and Gd and is present in an amount from about 0.1 wt % to about 5.0 wt %,
   Cu is present in an amount from about 1.0 wt % to about 5.0 wt %, and
   wherein the amount of M and/or Cu does not exceed 7 wt %.

2. The catalyst according to claim 1, wherein Cu is present in an amount from about 2.0 wt % to about 5.0 wt %.

3. The catalyst according to claim 1, wherein Cu is present in an amount from about 2.5 wt % to about 3.5 wt %.

4. The catalyst according to claim 1, wherein M is selected from the group consisting of Zn, Mg, Ce, and Th.

5. The catalyst according to claim 1, wherein M is present in an amount of from about 0.5 wt % to about 3.0 wt %.

6. The catalyst according to claim 1, wherein M is present in an amount of from about 0.5 wt % to about 1.5 wt %.

7. The catalyst according to claim 6, wherein M is selected from the group consisting of Zn, Mg, and Tb.

8. The catalyst according to claim 1, which is obtained by incipient wetness impregnation or precipitation deposition.

9. A catalytic converter, comprising:
   a body defining a chamber, the body having an inlet to receive an exhaust gas stream into the chamber, and an outlet to allow the exhaust gas stream to exit the body; and
   a catalyst arranged in the chamber for direct decomposition removal of NOx from exhaust gas stream, the catalyst comprising a dual dispersed supported metal oxide material, which comprises MOx-CuOx on a $Co_3O_4$ spinel oxide support, wherein
   M is selected from the group consisting of Zn, Ce, Mg, Tb, and Gd and is present in an amount from about 0.1 wt % to about 5.0 wt %,
   Cu is present in an amount from about 1.0 wt % to about 5.0 wt %, and
   wherein the amount of M and/or Cu does not exceed 7 wt %.

10. The catalytic converter according to claim 9, wherein Cu is present in an amount from about 2.0 wt % to about 5.0 wt %.

11. The catalytic converter according to claim 9, wherein Cu is present in an amount from about 2.5 wt % to about 3.5 wt %.

12. The catalytic converter according to claim 9, wherein M is present in an amount of from about 0.5 wt % to about 3.0 wt %.

13. The catalytic converter according to claim 9, wherein M is in an amount of from about 0.5 wt % to about 1.5 wt %.

14. The catalytic converter according to claim 9, configured to flow the exhaust gas stream through the catalytic converter at a temperature of from about 300° C. to about 650° C.

15. A method for direct decomposition removal of NOx from an exhaust gas stream, the method comprising:
   exposing an exhaust gas having NOx to a catalyst which comprises a catalyst comprising a dual dispersed supported metal oxide, which comprises MOx-CuOx on a $Co_3O_4$ spinel oxide support, wherein
   M is selected from the group consisting of Zn, Ce, Mg, Tb, and Gd and is present in an amount from about 0.1 wt % to about 5.0 wt %,
   Cu is present in an amount from about 1.0 wt % to about 5.0 wt %, and
   wherein the amount of M and/or Cu does not exceed 7 wt %.

16. The method according to claim 15, wherein Cu is present in an amount from about 2.0 wt % to about 5.0 wt %.

17. The method according to claim 15, wherein Cu is present in an amount from about 2.5 wt % to about 3.5 wt %.

18. The method according to claim 15, wherein M is in an amount of from about 0.5 wt % to about 3.0 wt %.

19. The method according to claim 15, wherein M is in an amount of from about 0.5 wt % to about 1.5 wt %.

20. The method according to claim 15, wherein the exhaust gas stream is at a temperature of from about 300° C. to about 650° C.

* * * * *